H. B. NEWHALL AND H. W. PLEISTER.
CONDUIT OR CABLE CLAMP AND BRIDLE RING.
APPLICATION FILED JULY 14, 1920.
1,365,623. Patented Jan. 11, 1921.
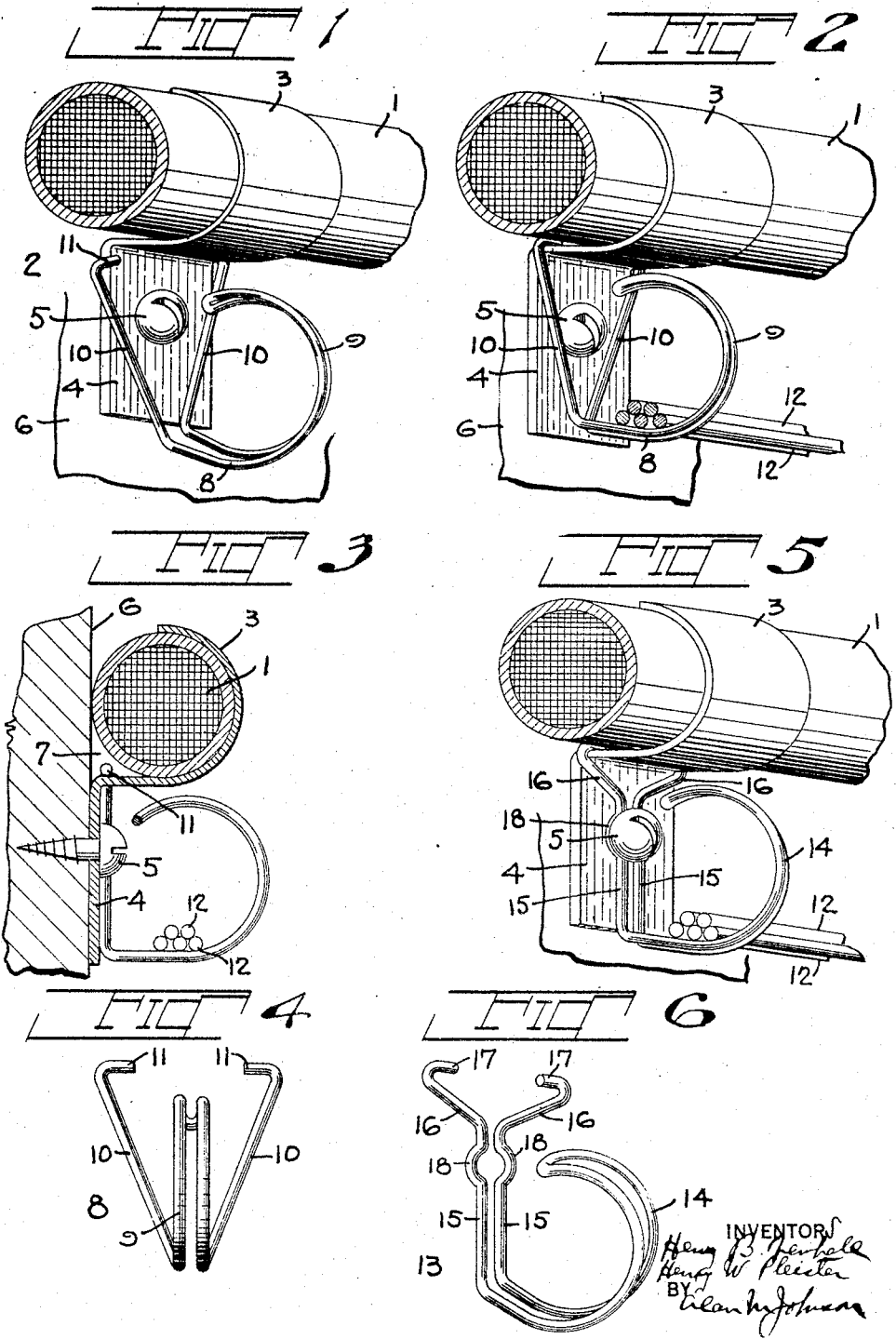

UNITED STATES PATENT OFFICE.

HENRY B. NEWHALL, OF PLAINFIELD, AND HENRY W. PLEISTER, OF WESTFIELD, NEW JERSEY; SAID PLEISTER ASSIGNOR OF ALL HIS RIGHT TO HENRY B. NEWHALL, EXECUTOR OF HENRY B. NEWHALL, DECEASED.

CONDUIT OR CABLE CLAMP AND BRIDLE-RING.

1,365,623.   Specification of Letters Patent.   Patented Jan. 11, 1921.

Application filed July 14, 1920. Serial No. 396,138.

*To all whom it may concern:*

Be it known that we, HENRY B. NEWHALL, a citizen of the United States, resident of Plainfield, in the county of Union and State of New Jersey, and HENRY W. PLEISTER, a citizen of the United States, resident of Westfield, in the county of Union and State of New Jersey, have invented certain new and useful Improvements in Conduit or Cable Clamps and Bridle-Rings, of which the following is a specification, taken in connection with the accompanying drawings.

Our invention relates to the combination of a conduit or cable clamp and a bridle ring, and also to the bridle ring as a sub-combination or article of manufacture.

Our invention further relates to a bridle ring which can be hooked on to a conduit or cable clamp without the clamp being provided with any special coöperating member or surface to coöperate with the bridle ring.

In the figures, in which we have shown different embodiments of our invention, the same reference numerals refer to similar parts in the several figures.

Figure 1 is a perspective view of a conduit or cable clamp provided with a hook and base member to which one form of our bridle ring is about to be attached;

Fig. 2 is a perspective view, similar to Fig. 1, but showing the bridle ring attached to the hook of the clamp member;

Fig. 3 is a vertical section of the device as shown in Fig. 2;

Fig. 4 is a face or front view of one form of our bridle ring;

Fig. 5 is a perspective view of a conduit or cable clamp, the cable supported thereby, and a modified form of our bridle ring;

Fig. 6 is a perspective view of the modified form of bridle ring shown in Fig. 5.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By our invention we take any ordinary form of conduit or cable clamp and attach to it a bridle ring without forming any special coöperating surfaces or members on the clamp. Our invention is adapted to be used with cable clamps now mounted, or which may hereinafter be installed. Preferably we make the bridle ring of any suitable material and form it into any shape or construction which will engage with, and be supported by, the hook member of a conduit or cable clamp. Preferably the bridle ring is so formed that it is provided with arms which engage above the hook member in the "dead space" which is formed by the circular contour of the cable. It will therefore be seen that no screw-threads, flanges, holes, slots, lugs or any other special coöperating surface or surfaces have to be provided on the conduit or cable clamp to receive our bridle ring.

We have shown by way of example two forms of bridle rings, but it is of course to be understood that our invention is not to be limited to these forms which are shown simply by way of example.

The cable 1 is supported by means of the conduit or cable clamp 2, having the hook portion 3 and the base member 4, and the securing screw 5 passing through the base and into the wall or other suitable support 6. This conduit or cable clamp may be of any suitable construction.

The cable 1 is pressed against the wall or other suitable support 6 and necessarily leaves a dead space 7 which is unfilled by the cable. By our invention we utilize this space to support a bridle ring, whenever the traffic on the line increases to such an extent that the capacity of the installation must be increased.

In one form of our invention we make a bridle ring 8 preferably, though not necessarily, out of wire bent back on itself to form an open ring 9 and a divided shank 10, 10 the ends of the shank being bent toward each other to form arms 11, 11.

To attach our bridle ring to a conduit or cable clamp, which may just have been installed, or which might have been in use for several years, it is merely necessary to slip one of the arms 11 into the dead space 7, on one side of the hook 3, and then spring the other arm 11 out slightly so that it will engage in the same dead space but on the other side of the hook member 3, as shown for example in Fig. 2. The bridle wires 12, 12 can then be strung through the open ring 9.

In some cases we may form our bridle ring as shown in Figs. 5 and 6, in which the bridle ring 13 is also preferably, though not necessarily, formed of wire bent back on itself to form an open ring 14, the two ends 15, 15 of the wire being brought parallel to each other to form a shank, the upper portion of the shank being bent out at 16, 16 sufficiently to extend across the hook member 3 of the conduit or cable clamp. The arms 17, 17 engage in the dead space 7 the same as shown in Fig. 5. Preferably, though not necessarily, we bend the ends 15, 15 to form the bows 18, 18, Fig. 6, so that the ends 15, 15 forming the shank will more readily fit under the head of the screw 5, as shown in Fig. 5.

In the first form of our invention, our bridle ring is entirely supported by the hook member 3. In the modified construction shown in Figs. 5 and 6, the bridle ring is partly supported by the hook member 3, and partly by the securing screw 5.

Should it ever be desired to remove the bridle wires, all that is necessary in the construction shown in Figs. 1 to 4 is to spread the ends 10, 10 so as to release one of the arms 11 from engagement with the hook member 3, when the other arm can be readily slipped out of the dead space 7.

In the second construction, shown in Figs. 5 and 6, in addition to spreading the arms 15, 15, it will also be necessary to loosen the head of the screw 5. In both constructions the bridle rings may be used again with the same or similar conduit or cable clamps.

Having thus described this invention in connection with illustrative embodiments thereof, to the details of which we do not desire to be limited, what is claimed as new and what is desired to secure by Letters Patent is set forth in the appended claims.

What we claim is:—

1. The combination of a conduit or cable clamp having a hook portion and a base, a bridle ring having a double shank, each part of the shank adapted to engage the hook and be supported thereby.

2. The combination of a conduit or cable clamp having a hook portion and a base, a bridle ring formed of wire bent back on itself to form an open ring, the two ends of the wire formed with arms to engage over the hook of the conduit or cable clamp.

3. The combination of a conduit or cable clamp having a hook portion and a base and a bridle ring partly supported by the hook portion and partly by a securing screw.

4. The combination of a conduit or cable clamp having a hook portion and a base and a bridle ring having a divided shank engaging the head of a securing screw and also the hook of the conduit or cable clamp.

5. The combination of a conduit or cable clamp having a hook portion and a base and a bridle ring formed of wire bent back on itself to form an open ring, the two ends of the wire extending parallel to each other to form a shank which is adapted to engage under the head of a securing screw, the ends of the shank being bent to form arms which engage with the hook of the conduit or cable clamp.

6. A new article of manufacture comprising a bridle ring having an open ring, a divided shank adapted to engage under the head of a securing screw, and means on the end of the shank to engage with the hook of a conduit or cable clamp.

7. A new article of manufacture comprising a bridle ring formed from wire bent back on itself to form an open ring, the ends of the wire being provided with arms to hook onto the hook member of a conduit or cable clamp.

8. A new article of manufacture comprising a bridle ring formed from wire bent back on itself to form an open ring, the ends of the wire being brought together to form a divided shank adapted to fit under the head of a securing screw, and the two ends of the wire being provided with arms to hook onto the hook member of a conduit or cable clamp.

HENRY B. NEWHALL.
HENRY W. PLEISTER.

Witnesses:
A. M. WILLIAMS,
M. R. RYAN.